US012732096B2

(12) United States Patent
Huang

(10) Patent No.: US 12,732,096 B2
(45) Date of Patent: Sep. 8, 2026

(54) CONTROL METHOD AND CONTROL APPARATUS FOR PFC CIRCUIT AND SWITCHING POWER SUPPLY SYSTEM

(71) Applicant: OmniOn Power Technology GmbH, Baden (CH)

(72) Inventor: Zhongmin Huang, Shanghai (CN)

(73) Assignee: OmniOn Power Technology GmbH, Baden (CH)

(*) Notice: Subject to any disclaimer, the term of this patent is extended or adjusted under 35 U.S.C. 154(b) by 159 days.

(21) Appl. No.: 18/610,756

(22) Filed: Mar. 20, 2024

(65) Prior Publication Data

US 2024/0348156 A1 Oct. 17, 2024

(30) Foreign Application Priority Data

Apr. 14, 2023 (CN) ......................... 202310403094.6

(51) Int. Cl.
*H02M 1/42* (2007.01)

(52) U.S. Cl.
CPC ................................ *H02M 1/4225* (2013.01)

(58) Field of Classification Search
CPC .................................................. H02M 1/4225
See application file for complete search history.

(56) References Cited

U.S. PATENT DOCUMENTS 11,063,510 B2 * 7/2021 Ping .................... H02M 1/4225
2008/0272756 A1 * 11/2008 Melanson ........... H02M 1/4225 323/282
2016/0352216 A1 * 12/2016 Sonnaillon .......... H02M 1/4208
2021/0126525 A1 * 4/2021 Sato .................... H02M 1/4225

OTHER PUBLICATIONS

Forbes, Jason; Ordonez, Martin, Anun, Matias; "Improving the Dynamic Response of Power Factor Correctors Using Simple Digital Filters: Moving Average Filter Comparative Evaluation"; 2013 IEEE Energy Conversion Congress and Exposition; Sep. 2013; IEEE; pp. 4814-4819.*

* cited by examiner

*Primary Examiner* — Harry R Behm
(74) *Attorney, Agent, or Firm* — CKC & Partners Co., LLC

(57) ABSTRACT

Embodiments of the present disclosure provide a control method and a control apparatus for a PFC circuit and a switching power supply system. The method includes: obtaining a sampled voltage data set, the sampled voltage data set representing a sampled voltage for sampling an output voltage of the PFC circuit at a predetermined sampling frequency within target time window of a predetermined duration; based on the sampled voltage data set, determining a sampled average value of a sampled voltage within the time window; determining a difference between the sampled average value and a reference output voltage; and based on a product of the determined difference and a signal indicative of a phase of an input voltage of the PFC circuit, generating a control signal to control ON and OFF of a switching device of the PFC circuit.

17 Claims, 11 Drawing Sheets

CONTROL METHOD AND CONTROL APPARATUS FOR PFC CIRCUIT AND SWITCHING POWER SUPPLY SYSTEM

CROSS-REFERENCE TO RELATED APPLICATIONS

This application claims priority to Chinese Patent Application No. 202310403094.6, filed Apr. 14, 2023, and titled CONTROL METHOD AND CONTROL APPARATUS FOR PFC CIRCUIT AND SWITCHING POWER SUPPLY SYSTEM, which is hereby incorporated by reference in its entirety.

BACKGROUND

Embodiments of the present disclosure relate to the field of power electronic technology, and more particularly, to a control method and a control apparatus for a power factor correction (PFC) circuit and a switching power supply system.

With the development of power electronic technology, power electronic equipment is widely used, resulting in harmonics in a power grid and reactive power increasingly prominent. For example, rectifiers and filters cause wave distortion of an input current on a grid side, showing a pulse-like waveform, and this current waveform contains a large number of harmonic components and greatly reduces the power factor. Excessive harmonics and low power factor are harmful to the grid and interfere with other electrical equipment.

The PFC circuit can effectively alleviate the harmonic and the reactive power caused by the power electronic equipment. With the PFC circuit, the power factor on an input side of the power electronic equipment would increase and the total harmonic distortion (THD) would reduce. However, the current PFC technologies still suffer from some deficiencies, and in some cases, large THD and power factor reduction may still occur after power factor correction using the PFC circuit.

BRIEF DESCRIPTION

Based on the above problems, according to exemplary embodiments of the present disclosure, a method for controlling the PFC circuit, a control apparatus for the PFC circuit, a computer-readable storage medium, and a switching power supply system are provided.

In a first aspect of the present disclosure, there is provided the method for controlling the PFC circuit. The method includes: obtaining a sampled voltage data set, the sampled voltage data set representing a sampled voltage for sampling an output voltage of the PFC circuit at a predetermined sampling frequency within a target time window of a predetermined duration; based on the sampled voltage data set, determining a sampled average value of a sampled voltage within the time window; determining a difference between the sampled average value and a reference output voltage; and based on a product of the determined difference and a signal indicative of a phase of an input voltage of the PFC circuit, generating a control signal to control ON and OFF of a switching device of the PFC circuit.

In some embodiments of the present disclosure, based on the sampled voltage data set, determining the sampled average value of the sampled voltage within the time window includes: subtracting at least one sampled voltage within the previous time window from a first summed value of sampled voltage data within a previous time window preceding the target time window to generate an intermediate value, a sampled point corresponding to the at least one sampled voltage being located within the previous time window and outside the target time window; adding the intermediate value to at least one sampled voltage obtained after the previous time window to generate a second summed value of sampled voltage data within the target time window; and determining the sampled average value based on the second summed value and the number of samples within the target time window.

In some embodiments of the present disclosure, the sampled voltage data within the previous time window and within the target time window are stored in a first-in-first-out manner.

In some embodiments of the present disclosure, the number of samples within the target time window is 2 to the power of M, where M is a positive integer.

In some embodiments of the present disclosure, determining the sampled average value based on the second summed value and the number of samples within the target time window includes: right shifting the second summed value based on the number of samples to generate the sampled average value.

In some embodiments of the present disclosure, the predetermined duration is a period duration of a voltage across an AC side of the PFC circuit.

In some embodiments of the present disclosure, based on the product of the determined difference and a signal indicative of the phase of an input voltage of the PFC circuit, generating a control signal to control ON and OFF of the switching device of the PFC circuit includes obtaining the input voltage and the input current of the PFC circuit; generating the control signal based on the product of the input voltage and the determined difference and based on the input current.

In a second aspect of the present disclosure, there is provided the control apparatus for the PFC circuit including: a processor; and a memory coupled to the processor, the memory having instructions stored therein which, when executed by the processor, cause the control apparatus to perform the method of the first aspect.

In a third aspect of the present disclosure, there is provided a computer readable storage medium having computer program codes stored thereon which, when executed, performs the method of the first aspect.

In a fourth aspect of the present disclosure, there is provided the switching power supply system including: the PFC circuit; and the control apparatus according to the second aspect.

It should be understood that the description in the summary section is not intended to define key or critical features of the embodiments of the disclosure, nor is it intended to limit the scope of the disclosure. Other features of the present disclosure will become readily apparent from the following description.

BRIEF DESCRIPTION OF THE DRAWINGS

Through the following detailed description with reference to the drawings, the above and other features, advantages and objectives of example embodiments of the present disclosure will become more apparent. In the drawings, the same or similar reference signs refer to the same or similar components.

DETAILED DESCRIPTION

Embodiments of the present disclosure will be described in more detail below with reference to the drawings. While certain embodiments of the present disclosure have been illustrated in the accompanying drawings, it is to be understood that the disclosure may be embodied in various forms and should not be construed as limited to the embodiments set forth herein; rather, these embodiments are provided so that this disclosure will be thorough and complete. It should be understood that the drawings and embodiments of the present disclosure are for illustrative purposes only and are not intended to limit the scope of the present disclosure.

In the description of the embodiments of the present disclosure, the term "includes" and its variants are to be read as open-ended terms that mean "includes, but is not limited to." The term "based on" is to be read as "based at least in part on." The terms "one example embodiment" and "one embodiment" are to be read as "at least one example embodiment." The terms "first", "second" and so on can refer to same or different objects. The following text also can include other explicit and implicit definitions.

Figure 1:
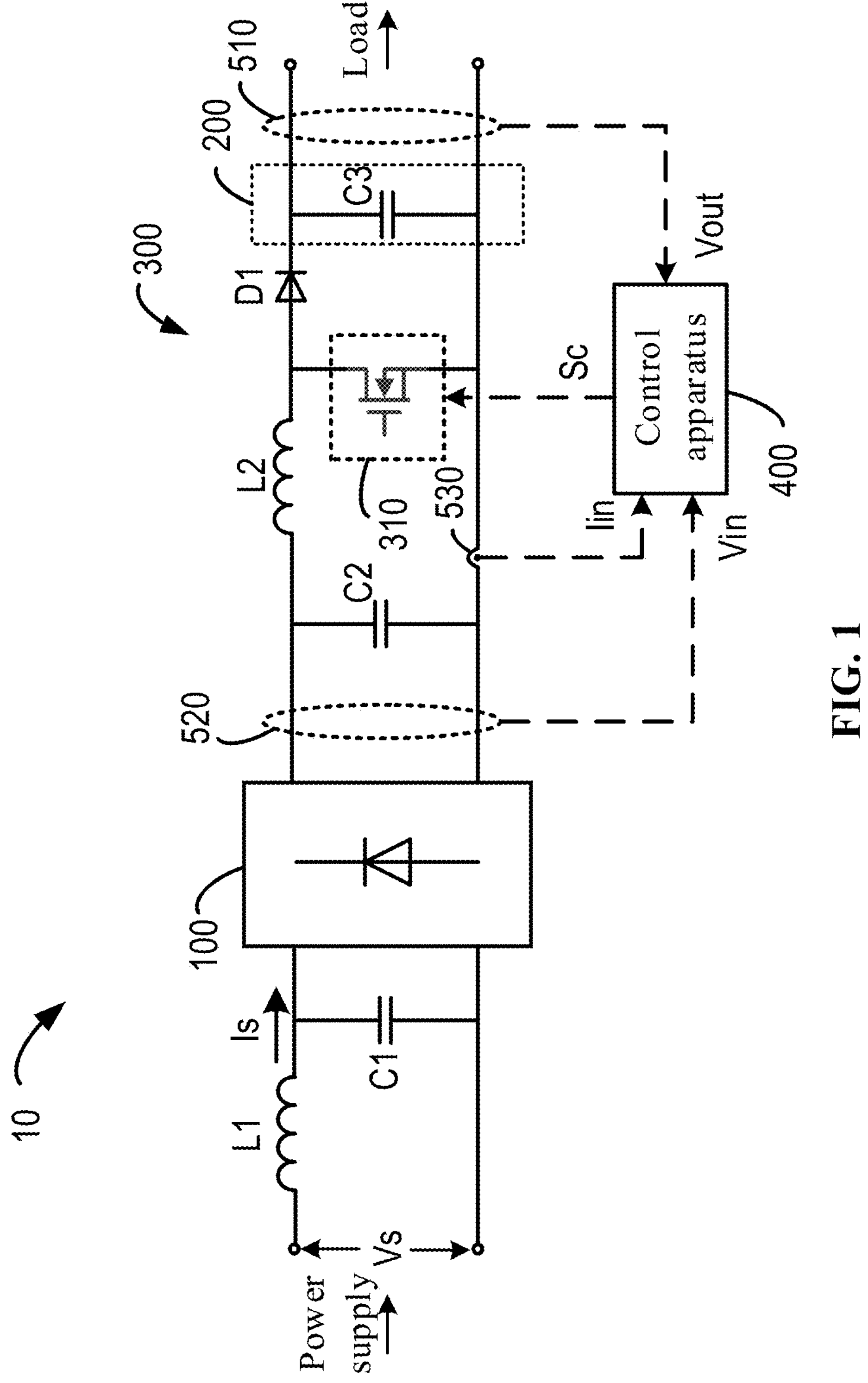
FIG. 1 illustrates a schematic circuit diagram of the switching power supply system according to an embodiment of the present disclosure.

FIG. 1 illustrates a schematic circuit diagram of a switching power supply system 10 according to an embodiment of the present disclosure. The switching power supply system 10 can convert power from the alternating current power supply (e.g., a utility grid) by switching the switching devices on and off, and provide converted desired power to a load to power the load. Although the switching power supply system 10 is shown as a single-phase system, the implementation of the switching power supply system 10 is not so limited and may be a three-phase system or other number of phases.

As shown in FIG. 1, the switching power supply system 10 includes a rectifier 100 and a filter 200. The rectifier 100 may convert AC power from the alternating current power supply to DC power, and the filter 200 may filter a rectified voltage and a current to remove ripples or harmonics from an output voltage and a current. As an example, the rectifier 100 may be a single-phase bridge type uncontrolled rectifier, and the filter 200 may include a filter capacitor C3. However, it will be appreciated that the implementation of the rectifier 100 and the filter 200 is not so limited and may be any suitable type of rectifier and filter, for example, the rectifier 100 may also be a single-phase bridge fully controlled rectifier, or may be a three-phase uncontrolled rectifier or a three-phase phase controlled rectifier in the case that the switching power supply system is a three-phase system. In some embodiments, a filter including an inductor L1 and a capacitor C1 may be provided between the alternating current power supply and an input side of the rectifier 100 for suppressing or filtering high frequency harmonics.

The switching power supply system 10 may further include a PFC circuit 300. As an example, the PFC circuit 300 may be coupled between the rectifier 100 and the filter 200 and include a switching device 310, a diode DI, an inductor L2 and a capacitor C2. Implementations of the switching device 310 include, but are not limited to, an Insulated Gate Bipolar Translator (IGBT), a Junction Field-Effect Transistor (JFET), a Bipolar Junction Transistor (BJT), a Metal-Oxide-Semiconductor Field Effect Transistor (MOSFET), a Gate Turn Off thyristor (GTO), a MOS-Controlled Thyristor (MCT), an Integrated Gate-Commutated Thyristor (IGCT), a silicon carbide (SiC) switching device or a gallium nitride (GaN) switching device. The switching device 310, the diode DI, the inductor L2 and the capacitor C2 are coupled to form a Boost DC-DC converter topology. That is, the PFC circuit 300 may be a boost-type power factor corrector. It will be appreciated that in addition to boost power factor correctors, the PFC circuit 300 may be other types of power factor correctors, such as flyback power factor correctors.

The switching power supply system 10 may further include a control apparatus 400, voltage sensing devices 510 and 520, and a current sensing device 530. The control apparatus 400 may be implemented in a variety of ways. For example, the control apparatus 400 may be implemented in the form of a controller with computing and processing capabilities, in the form of circuitry in analog and/or digital circuitry, or in a combination of the various forms described above. The voltage sensing devices 510 and 520 may be voltage sensors, voltage transformers, voltage dividers, or any suitable type of device that senses a voltage, and the current sensing device 530 may be a current sensor, a current transformer, or any suitable type of device that senses a current. The voltage sensing devices 510 and 520 may sense the voltage across the output and input sides of the PFC circuit 300, respectively, while the current sensing device 530 may sense the current at the input side of the PFC circuit 300.

As previously mentioned, non-linear loads such as rectifiers may distort the current input by the alternating current power supply to the switching power supply system and thus cause a reduction in the power factor at the input side of the switching power supply system. By providing the PFC circuit 300 and the control apparatus 400, the power factor can be effectively increased. Specifically, the control apparatus 400 may receive voltage sense signals $V_{out}$ and $V_{in}$ from the voltage sense devices 510 and 520 and current sense signals lin from the current sense device 530 and control the switching device 310 of the PFC circuit 300 based on the received sense signals such that the input current of the PFC circuit 300 has the same phase as the input voltage. Thus, the power factor correction for switching power supply system 10 can be achieved while providing desired DC power to the load.

Figure 2:
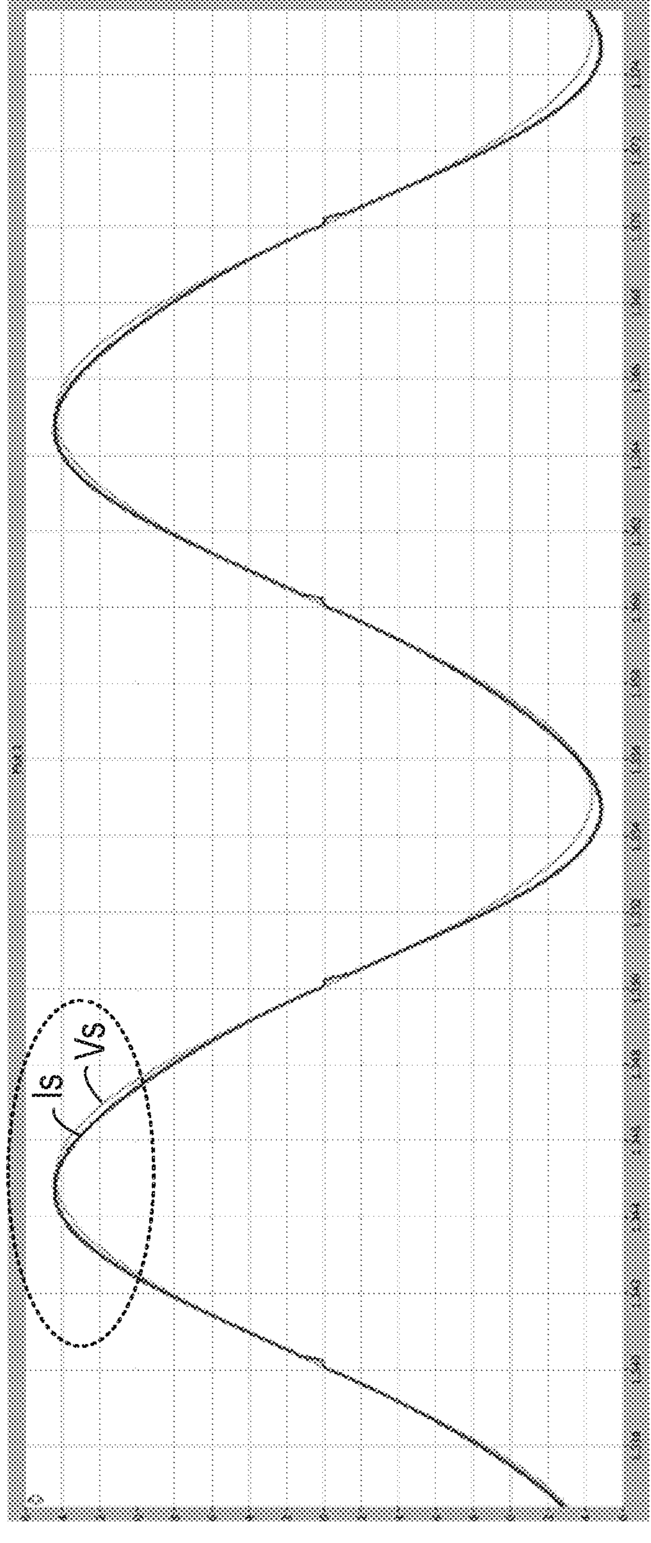
FIG. 2 illustrates a waveform diagram showing the input voltage and the input current of an alternating current power supply input to the switching power supply system in a conventional scheme.

FIG. 2 illustrates a waveform diagrams of the input voltage Vs and the input current Is in a conventional scheme. As shown in FIG. 2, although the switching power supply system 10 is provided with the PFC circuit 300 for power factor correction, there is a case where the phase of the input current Is not synchronized with that of the input voltage Vs. For example, as shown by an oval dashed box in FIG. 2, in some cases, the phase of the input current Is significantly precedes the phase of the input voltage Vs, which means that the phase of the input current Is does not completely follow the phase of the input voltage Vs, thus causing power factor degradation and an increase in the THD.

Studies have shown that this occurs in relation to ripples in the output voltage $V_{out}$ of the switching power supply system 10 or the PFC circuit 300. The output voltages $V_{out}$ of the PFC circuit 300 typically each have a ripple, and the frequency of the ripple is typically twice the frequency of the alternating current power supply. For example, where the alternating current power supply is the utility grid and has a power frequency of 50 Hz, the output voltage $V_{out}$ of the PFC circuit 300 has a ripple of 100 Hz.

Figure 3:
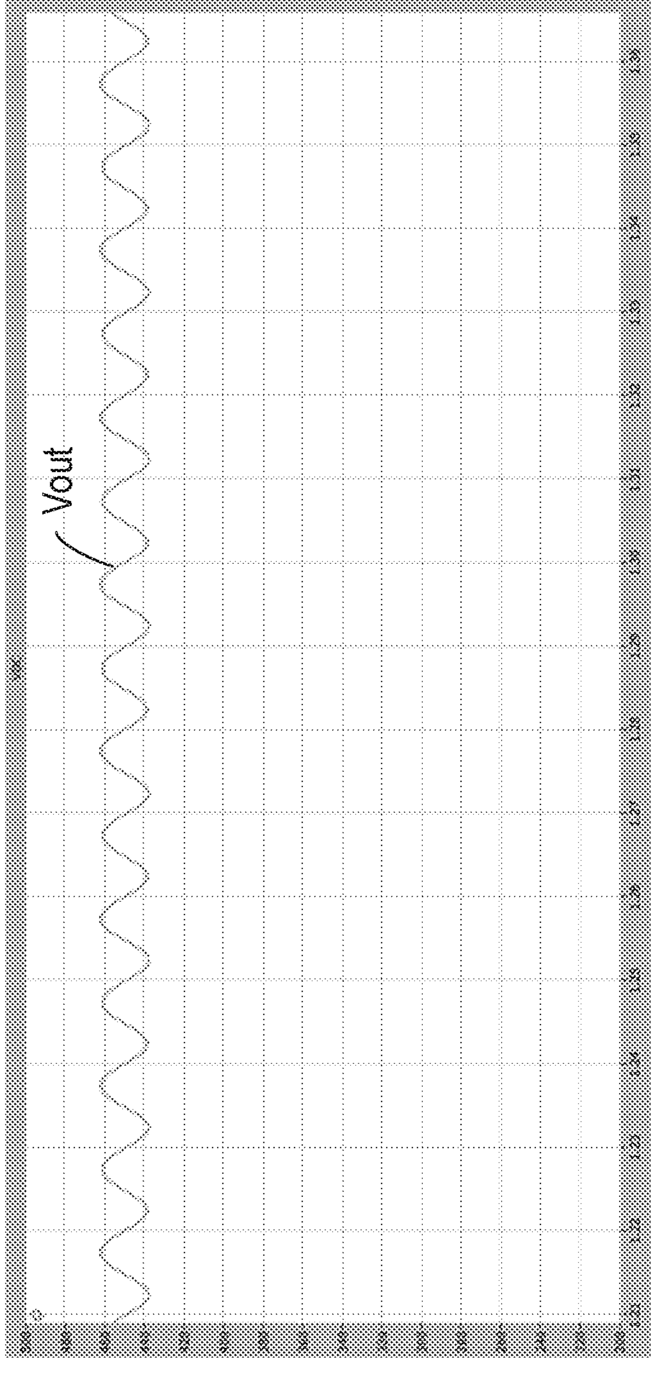
FIG. 3 illustrates a waveform diagram of the output voltage of the switching power supply system in a conventional scheme.

FIG. 3 illustrates a waveform diagram of the output voltage $V_{out}$ of the switching power supply system 10 in a conventional scheme. As shown in FIG. 3, when the load is large, the peak to peak value of the ripple of the output voltage $V_{out}$ will become large and may be as high as 20 V, for example. As a result, the THD of the output voltage $V_{out}$ will also increase. When such the output voltage $V_{out}$ is sensed by the voltage sensing device 510 and supplied to the control apparatus 400, a condition will occur in which the controlled input current Is cannot keep up with the input voltage Vs, and thus the effect of the power factor correction is seriously affected.

Embodiments of the present disclosure provide an improved scheme for controlling the PFC circuit. In this improvement, the sensed or derived output voltage of the PFC circuit can be filtered in a simple and fast-dynamic-response manner, effectively eliminating the effect of output voltage ripple on the control of the PFC circuit, thus improving the power factor of the switching power supply and reducing the THD.

Figure 4:
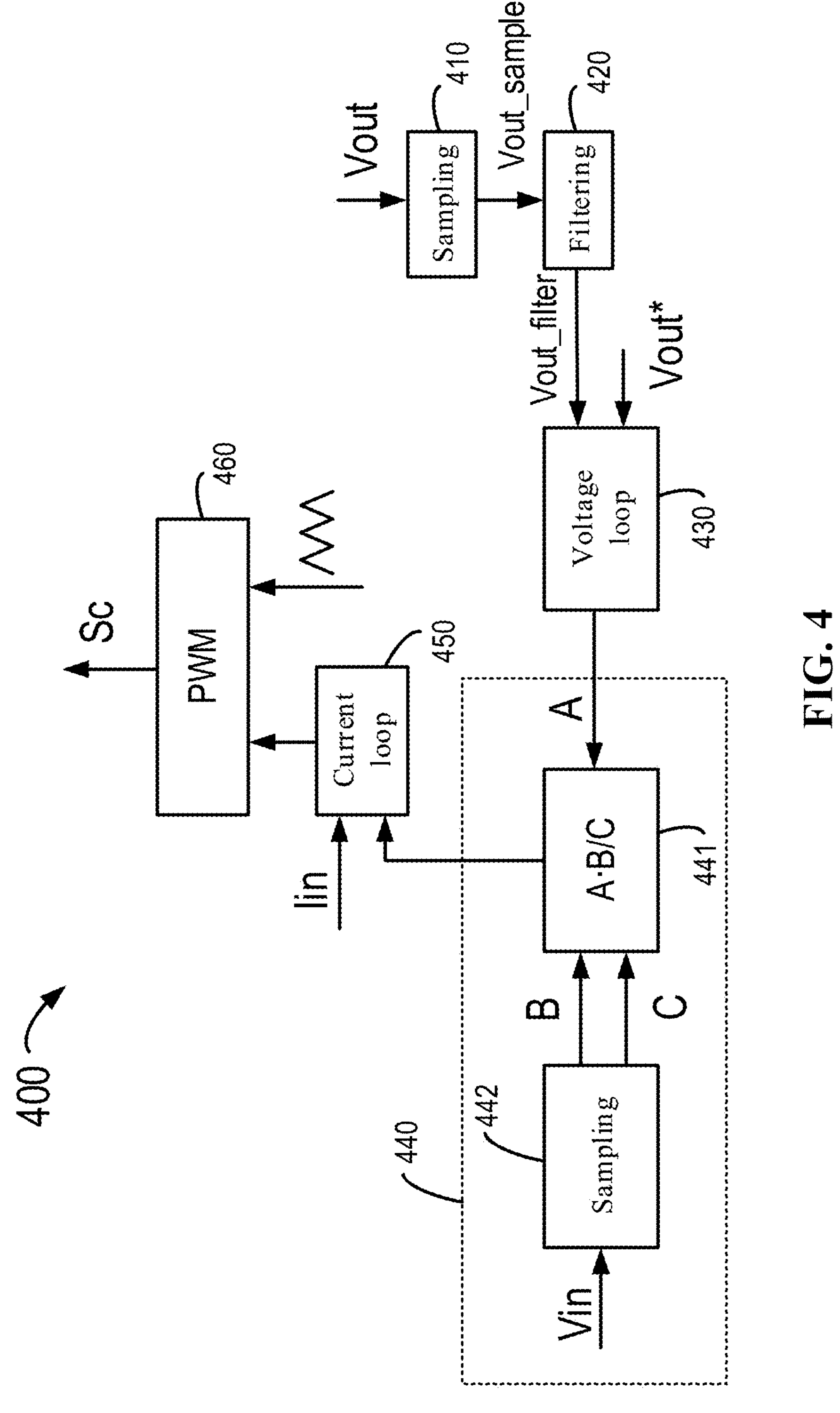
FIG. 4 illustrates a schematic block diagram of the control apparatus according to an embodiment of the present disclosure.

FIG. 4 illustrates a schematic block diagram of a control apparatus 400 according to an embodiment of the present disclosure. As shown in FIG. 4, the control apparatus 400 includes a sampling unit 410. The control apparatus 400 acquires, via the sampling unit 410, the sampled voltage data set, the sampled voltage data set representing the sampled voltage for sampling the output voltage of the PFC circuit 300 at a predetermined sampling frequency within the target time window of the predetermined duration. As an example, the sampling unit 410 may receive a sense signal indicative of the output voltage $V_{out}$ from the voltage sensing device 510 and sample the sense signal of the output voltage $V_{out}$ to generate a series of sampled values $V_{out}$ sample including at least a group or set of sampled voltages within the target time window of the predetermined duration.

Figure 5:
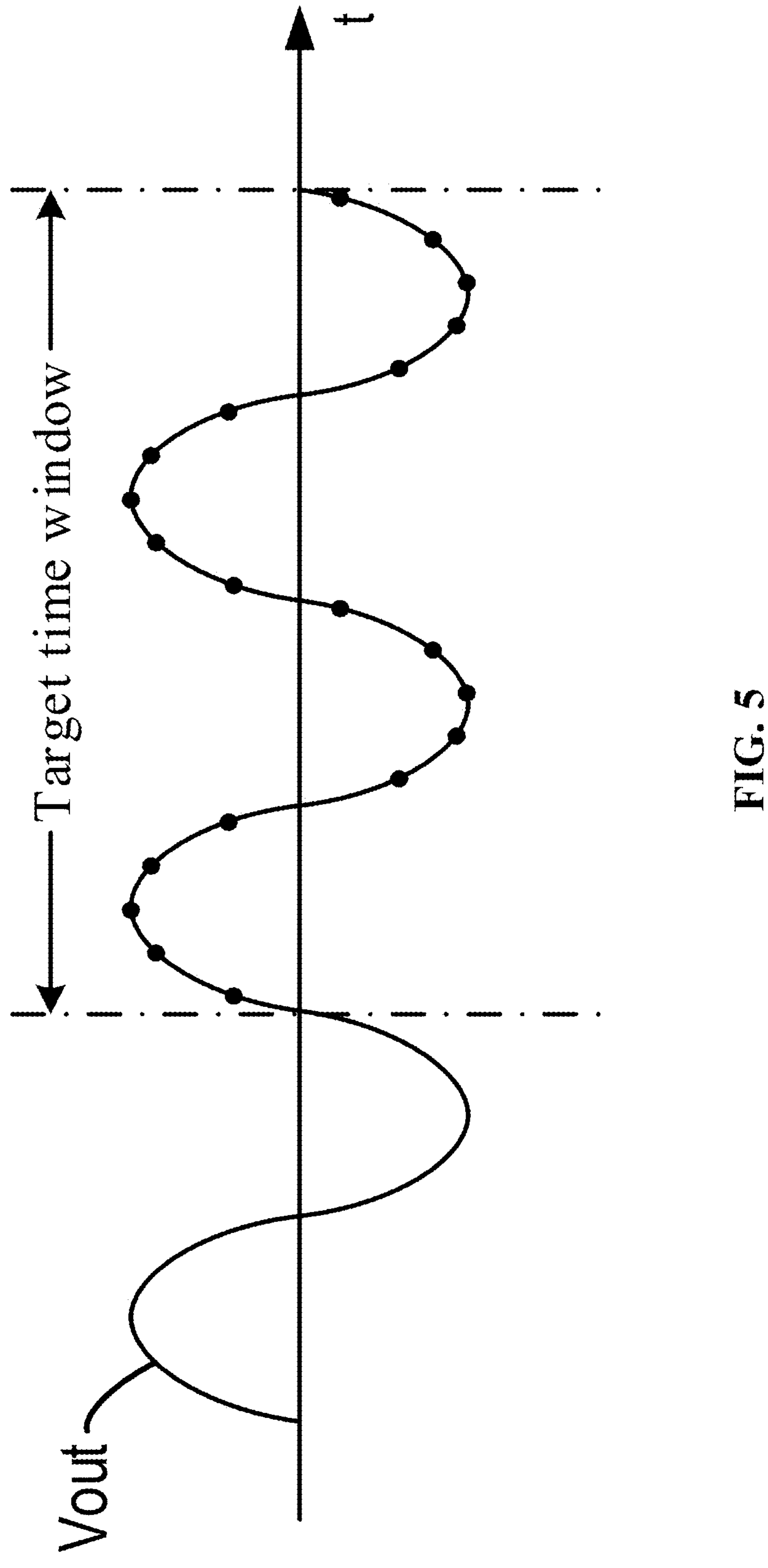
FIG. 5 illustrates a schematic diagram of the target time window according to an embodiment of the present disclosure.

FIG. 5 illustrates a schematic diagram of the target time window according to an embodiment of the present disclosure. In some embodiments of the present disclosure, the predetermined duration of the target time window is the period duration of a voltage across an AC side of the PFC circuit 300. For example, when the alternating current power supply of the switching power supply system 10 is a 50 Hz power frequency of utility grid, the predetermined duration of the target time window may be 20 ms. Since the ripple of the output voltage $V_{out}$ is twice the frequency of the alternating current power supply, the target time window covers two sine wave cycles of the ripple of the output voltage $V_{out}$. However, it will be appreciated that the predetermined duration of the time window may also be longer or shorter than the period duration of the voltage across an AC side of the PFC circuit 300.

According to an embodiment of the present disclosure, the control apparatus 400 further includes a filtering unit 420. The filtering unit 420 may determine a sampled average value $V_{out\_filter}$ of the sampled voltage within the target time window based on the sampled voltage data set. For example, in the event that the sampled voltage data set includes voltages at N sampled points, the filtering unit 420 may implement a filtering function by determining an average of the N sampled voltages. In this way, the filtering unit 420 can reliably filter out the ripple in the output voltage $V_{out}$, and has advantages of simplicity and fast response.

Figure 6:
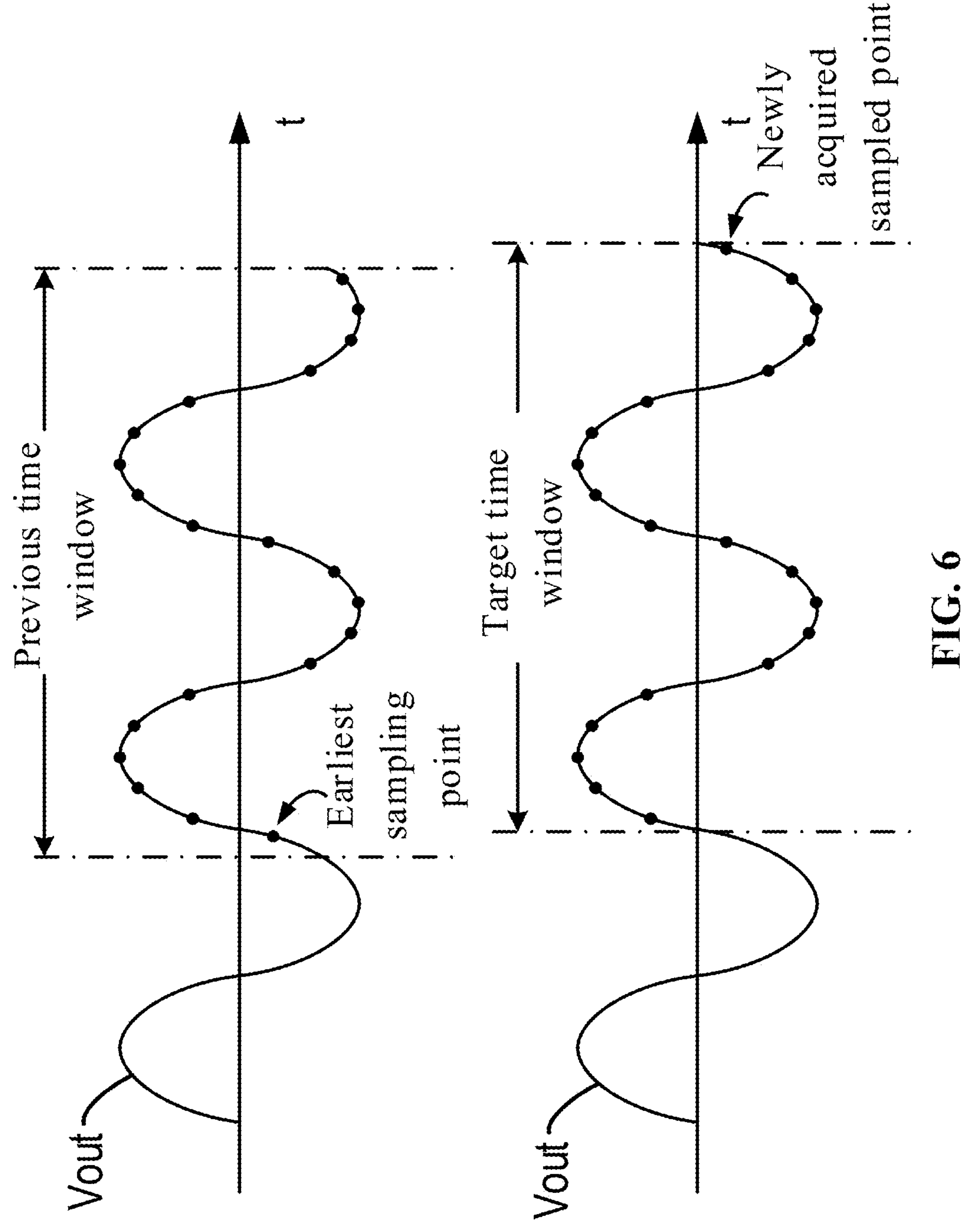
FIG. 6 illustrates a comparative schematic diagram of the previous time window and the target time window according to an embodiment of the present disclosure.

FIG. 6 illustrates a comparative schematic diagram of the previous time window and the target time window according to an embodiment of the present disclosure. In some embodiments of the present disclosure, the filtering unit 420 subtracts the at least one sampled voltage within the previous time window from the first summed value of sampled voltage data within the previous time window preceding the target time window to generate the intermediate value, the sampled point corresponding to the at least one sampled voltage being located within the previous time window and outside the target time window. The filtering unit 420 may then add the intermediate value to at least one sampled voltage acquired after the previous time window to generate the second summed value of sampled voltage data within the target time window, and determine the sampled average value based on the second summed value and the number of samples within the target time window. In particular, the time window may be a sliding window and evolve over time. There is an overlap in time between the target time window and the previous time window, i.e., many sampled points within the previous time window are still present in the target time window. Thus, a new sum of the sampled voltage data within the target time window may be determined using the summed value of the sampled voltage data of the previous time window and the newly acquired sampled voltage data, and thus the sampled average value may be further calculated. For example, the filtering unit 420 may subtract the sampled voltage of the earliest sampled point from the first summed value for the previous time window and then add the sampled voltage of the newly acquired sampled point, thereby acquiring the new summed value of the voltage data within the target time window. In this manner, only one subtraction operation and one addition operation are required to determine a sum of all sampled voltages within the target time window, avoiding the extensive multiplication operations used in conventional filters, and greatly improves the response speed of the control apparatus 400. In some embodiments of the present disclosure, the voltage data in the previous time window and the target time window are stored in a first-in-first-out manner. As an example, a buffer may be employed to store the sampled voltage data set. For example, in the case that the number of samples within the sliding time window is 64, 64 address cells may be provided to store the corresponding sampled voltages. The buffer may be managed in a first-in-first-out manner. Thus, the early data leaving the sliding time window may be removed from the buffer and the newly sampled voltage may be stored in the buffer, thereby enabling real-time updating of the sampled data.

In some embodiments of the present disclosure, the number of samples within the target time window may be 2 to the power of M, where M is a positive integer, and the filtering unit 420 may right shift the second summed value for the target time window by M bits to determine the sampled average value for the target time window. For example, when the number of samples is 64 (i.e., $2^6$), the sampled average value may be acquired by right shifting the second summed value by 6 bits, which is equivalent to performing an average operation of dividing the second summed value by the number of samples. In this manner, a division operation can be replaced with a shift operation having a faster response speed, thereby further improving the response speed of the control apparatus 400.

Figure 7:
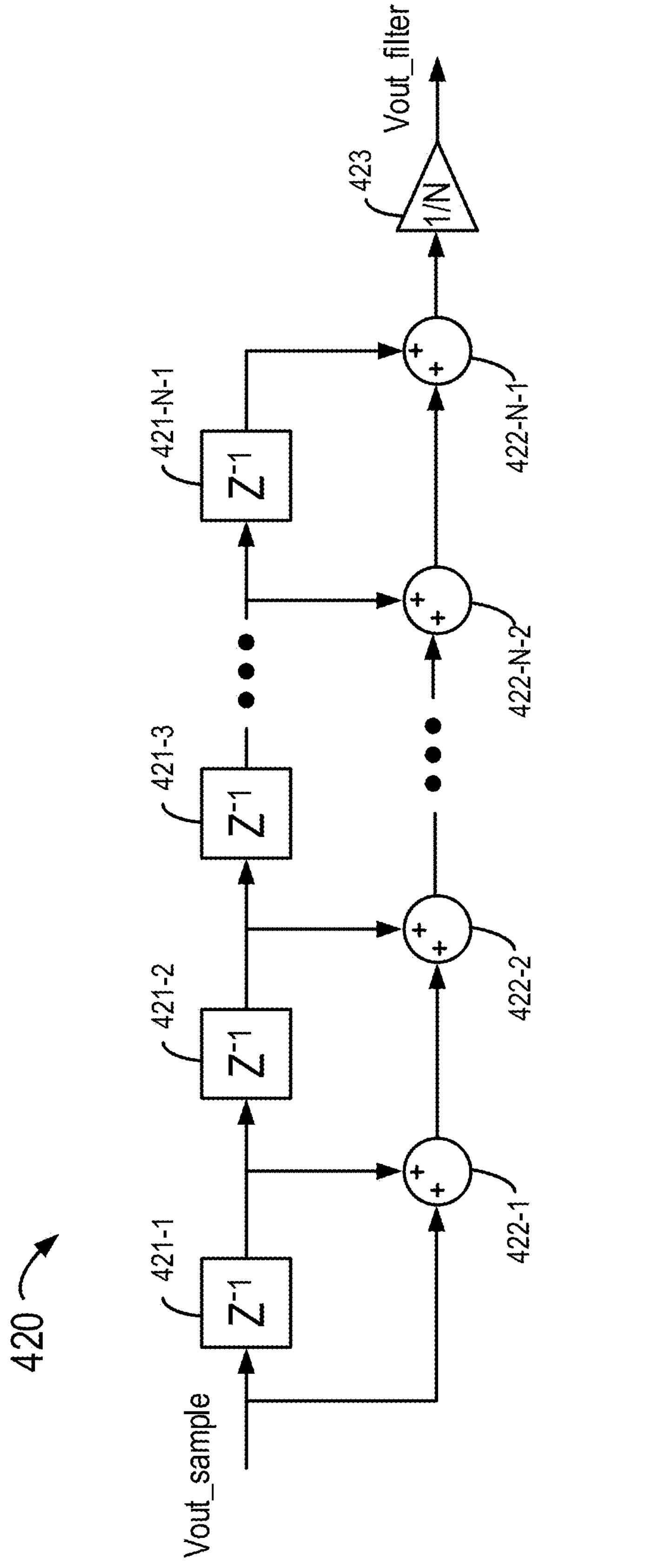
FIG. 7 illustrates a block diagram of an exemplary implementation of the filtering unit according to an embodiment of the present disclosure.

FIG. 7 illustrates a block diagram of an exemplary implementation of the filtering unit 420 according to an embodiment of the present disclosure. As shown in FIG. 7, the filtering unit 420 includes delay sections 421-1, 421-2 . . . 421-N-1, sum sections 422-1, 422-2 . . . 422-N-1, and an average calculating section 423, where N is the number of samples within the target time window. A transfer function G (Z) of the filtering unit 420 shown in FIG. 7 may be expressed by the following equation:

$$G(Z) = \frac{1}{N}\sum_{i=0}^{N-1} Z^{-i} \quad (1)$$

The filtering unit 420 corresponding to the equation (1) corresponds to a “sliding window filter”. That is, the time window slides over time and the sum of the sampled voltages within the time window can be updated with simple subtraction and addition operations to dynamically update the sampled average value within the time window. In this manner, the ripple in the output voltage $V_{out}$ can be filtered out effectively with a very fast response speed. As an example, the filtering unit 420 may be implemented with the following C-language code (the number N of sampled points within the time window is set to 64):

```
int16_t filter_index = 0;
int16_t filter_buffer[64] = { 0 };
int32_t filter_value = 0;
int16_t filter_function(int16_t Vbus)
{
    filter_value = filter_value − filter_buffer[ filter_index ];
    filter_value = filter_value + Vbus;
    filter_buffer[ filter_index ] = Vbus;
    filter_index = (filter_index + 1) % 64;
    return ( filter_value >> 6 );
}
```

The filter_index refers to the serial number of the 64 sampled points within the time window, the filter_buffer [64] refers to a buffer for storing the voltage values of the 64 sampled points, and the filter_value refers to the summed value of the voltages of all sampled points within the time window. The filter_index, the filter_buffer [64] and the filter_value are all set to zero in an initial state. In the filter_function, the voltage value filter_buffer [filter_index] of the earliest sampled point is first subtracted from the filter_value and then the voltage value Vbus of the newly acquired sampled point is added. The voltage value Vbus of the newly acquired sampled point is also stored in the corresponding location filter_buffer [filter_index] of the buffer to replace the voltage value of the earliest sampled point, and the filter_index is incremented. Finally, a shift right operation is performed on the filter_value, i.e., the filter_value is shifted right by 6 bits, thereby acquiring the sampled average value in the current time window.

Figure 8:
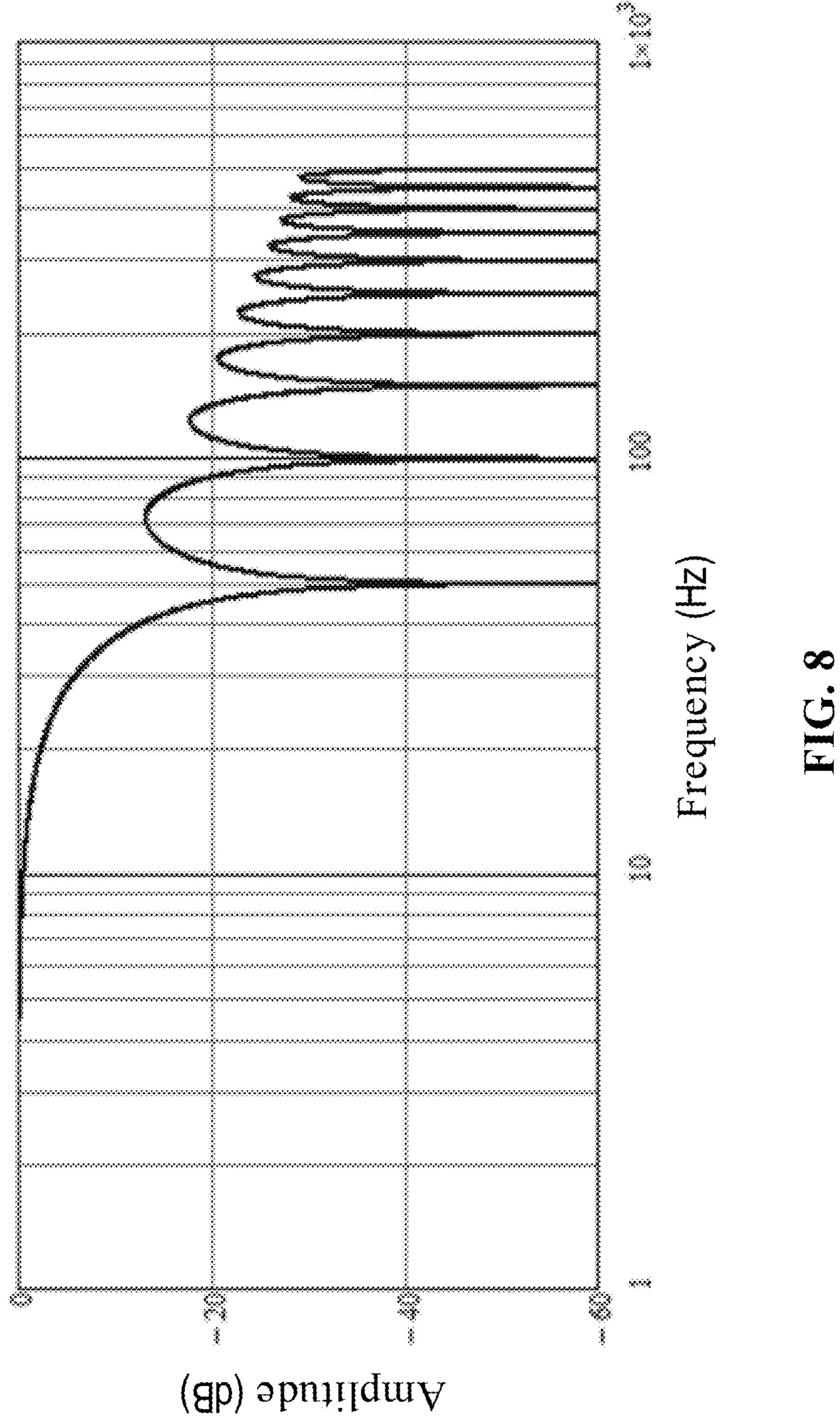
FIG. 8 illustrates an exemplary Bode diagram of the filtering unit according to an embodiment of the present disclosure.

FIG. 8 illustrates an exemplary Bode diagram of the filtering unit 420 according to an embodiment of the present disclosure. In the example shown in FIG. 8, it is assumed that the frequency of the voltage of the alternating current power supply is 50 Hz, and thus the filtering unit 420 is set to have the time window of 20 ms, and there are 64 sampled points within the time window, i.e., a sampling period of 0.3125 ms. As shown in FIG. 8, the filtering unit 420 has a very large attenuation at frequencies such as 50 Hz, 100 Hz and 150 Hz, and it can be seen therefrom that the filtering unit 420 can effectively filter the ripple of the output voltage $V_{out}$ of the PFC circuit 300.

Returning to FIG. 4, the control apparatus 400 also includes a voltage loop 430. The voltage loop 430 may determine a difference UA between the sampled average value $V_{out\_filter}$ and the reference output voltage $V_{out}$*. In one embodiment, the voltage loop 430 may also include a proportional integral regulator or other type of regulator to regulate the determined difference UA to improve control effect. By means of the voltage loop 430, the control apparatus 400 can implement closed loop control for the output voltage $V_{out}$ of the PFC circuit 300.

According to an embodiment of the present disclosure, the control apparatus 400 includes a multiplication unit 440. The multiplication unit 440 multiplies the difference UA determined by voltage loop 430 by a signal UB indicative of the phase of the input voltage $V_{in}$ of the PFC circuit 300. Thus, the multiplication unit 440 may generate a signal containing phase information of the input voltage $V_{in}$ and adjustment information of the output voltage $V_{out}$. In one embodiment, the multiplication unit 440 may include a multiplier 441 and a sampler 442, wherein the sampler 442 may receive a sense signal indicative of the input voltage $V_{in}$ from the voltage sensing device 520 and sample it, and thereby the sampler 442 provides the sampled signal to multiplier 441 as a signal UB indicative of the phase of input voltage $V_{in}$. Alternatively, the multiplication unit 440 may also store the phase change information of the power supply voltage Vs or the input voltage $V_{in}$ in advance without setting the sampler 442, and thus the multiplication unit 440 may provide the stored information in advance as a signal indicative of the phase of the input voltage $V_{in}$ to the multiplier 441. In one embodiment, the sampler 442 may also determine an effective value UC of the $V_{in}$ based on the sense signal from the voltage sensing device 520, which UC may be provided as a feed-forward signal to the multiplier 441 to cause the multiplier 441 to divide the effective value UC after multiplying the difference UA determined by the voltage loop 430 by the signal UB indicative of the phase. The effective value UC as the feed-forward signal may improve the control effect of the PFC circuit 300. It will be appreciated that the effective value UC may also be omitted, as may accomplish the objectives of the present disclosure.

In some embodiments of the present disclosure, the control apparatus 400 also includes a current loop 450 and a PWM unit 460. The current loop 450 may receive the signal from the multiplication unit 440 and compare it to a sense signal from the current sensing device 530 indicative of the input current $I_{in}$ of the PFC circuit 300. The current loop 450 may, for example, provide the compared difference signal to a PWM unit 460, or provide the compared difference signal to the PWM unit 460 after processing such as PI conditioning. The PWM unit 460 may compare the signal generated by the current loop 450 with a carrier signal, such as a triangular carrier, to generate a PWM signal for controlling the switching of the switching device 310 of the PFC circuit 300. By means of the current loop 450, the closed loop control for the input current $I_{in}$ can be achieved. However, it will be appreciated that in some cases the current loop 450 may be omitted and, for example, an open loop control may be used to control the current. In addition, in addition to PWM modulation, other suitable modulation may be used to implement switching control, and the present disclosure is not limited to this regard in any way.

Figure 9:
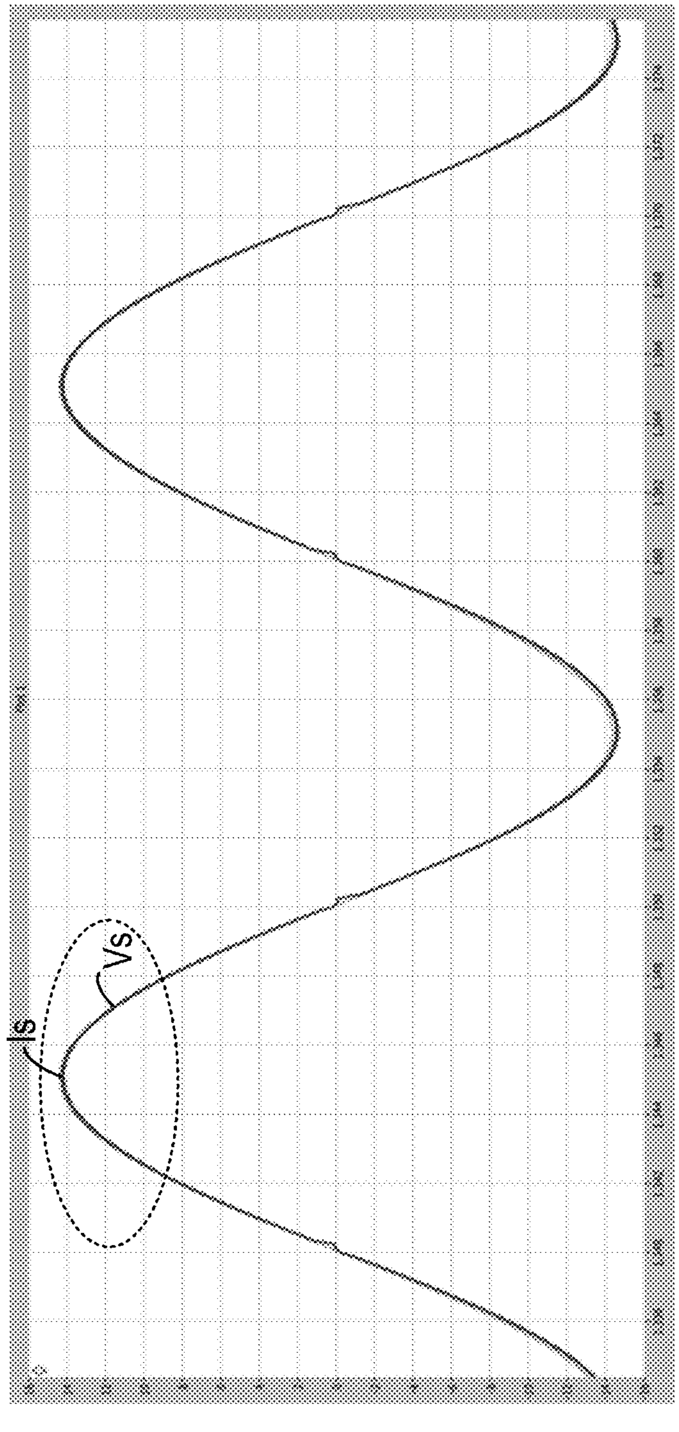
FIG. 9 illustrates a waveform diagram of the input voltage and the input current of the alternating current power supply input to the switching power supply system according to an embodiment of the present disclosure.

FIG. 9 illustrates a waveform diagram of the input voltage Vs and the input current Is according to an embodiment of the present disclosure. As shown in FIG. 9, by providing the control apparatus 400 including the filtering unit 420, the phase of the input current Is synchronized with the phase of the input voltage Vs, and the problem that there is a current phase advance in FIG. 2 is eliminated. That is, by providing the filtering unit 420, the control apparatus 400 can control the input current Is to completely keep up with the phase of the input voltage Vs. Thus, the power factor of the switching power supply system 10 on the input side is increased and the THD is reduced.

The control apparatus 400 for the PFC circuit 300 and the switching power supply system 10 including the control apparatus 400 according to the present disclosure are described in detail with reference to FIGS. 1 and FIGS. 4 to 9, and a control method for controlling the PFC circuit 300 according to the present disclosure will be described with reference to FIGS. 10 to 11.

Figure 10:
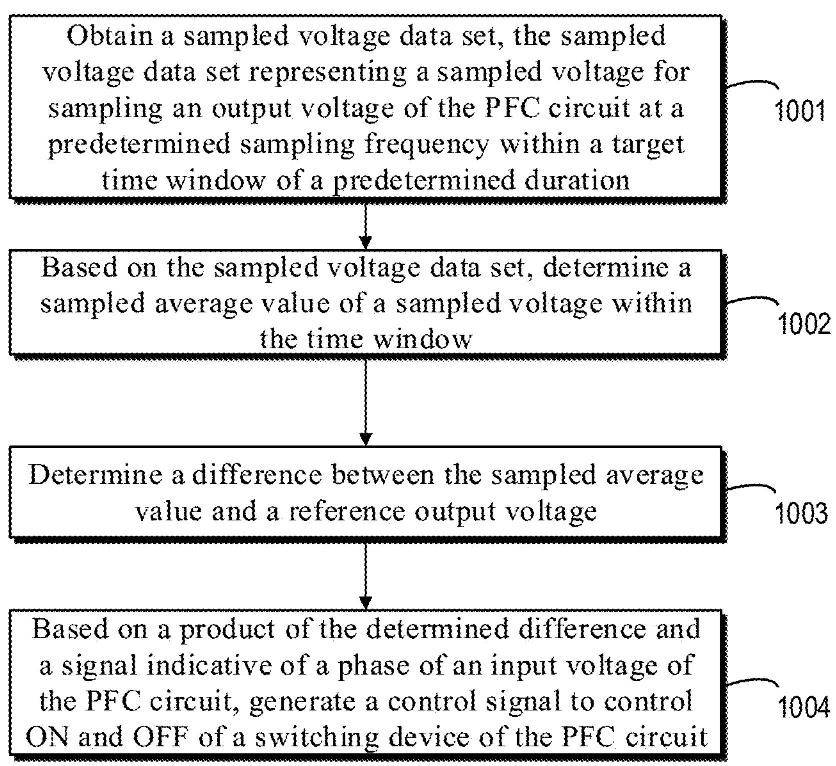
FIG. 10 illustrates a schematic flow diagram of a method for controlling the PFC circuit according to an embodiment of the present disclosure.

FIG. 10 illustrates a schematic flow diagram of a method 1000 for controlling the PFC circuit 300 according to an embodiment of the present disclosure. The method 1000 may be implemented in the switching power supply system 10 of FIG. 1 and may be performed, for example, by the control apparatus 400. It will be appreciated that the various aspects described above with respect to FIG. 1 and FIGS. 4-9 can be applied to the method 1000. For purposes of discussion, the method 1000 will be described in conjunction with FIG. 1 and FIGS. 4-9.

At block 1001, the control apparatus 400 obtains the sampled voltage data set representing a sampled voltage for sampling the output voltage $V_{out}$ of the PFC circuit 300 at a predetermined sampling frequency within a target time window of a predetermined duration. In some embodiments, the predetermined duration is the period duration of the voltage across the AC side of the PFC circuit.

At block 1002, the control apparatus 400 determines the sampled average value $V_{out\_filter}$ of the sampled voltage within the time window based on the sampled voltage data set.

At block 1003, the control apparatus 400 determines the difference between the sampled average value $V_{out\_filter}$ and the reference output voltage $V_{out}$*.

At block 1004, the control apparatus 400 generates, based on the product of the determined difference UA and the signal UB indicative of the phase of the input voltage of the PFC circuit 300, the control signal to control ON and OFF of the switching device 310 of the PFC circuit 300. In some embodiments, the control apparatus 400 obtains the input voltage $V_{in}$ and the input current $I_{in}$ of PFC circuit 300 and generates the control signal based on the product of input voltage $V_{in}$ and the determined difference UA and the input current $I_{in}$.

Figure 11:
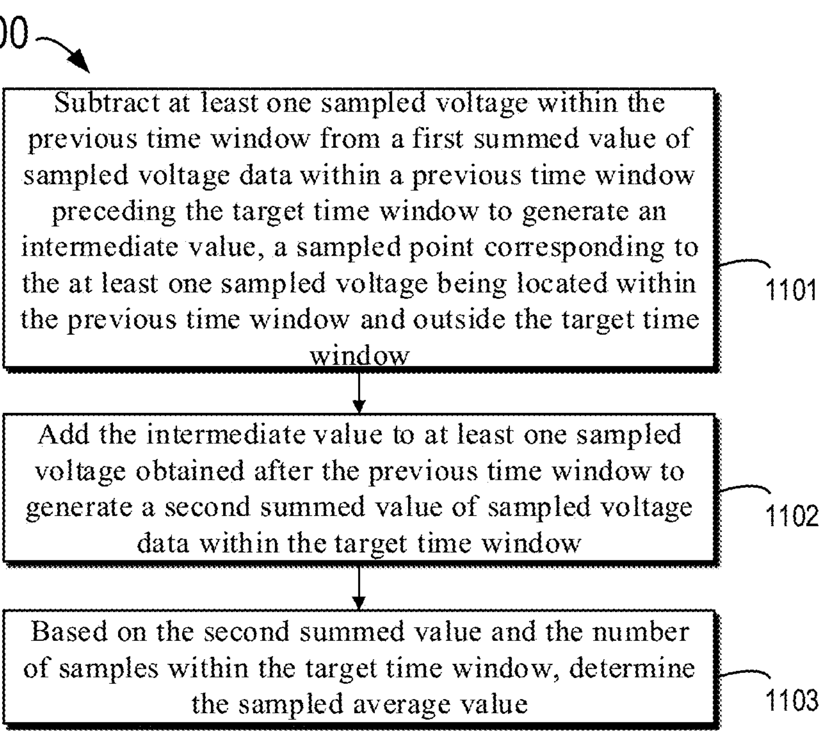
FIG. 11 illustrates a schematic flow diagram of a method of determining the sampled average value of the sampled voltage within a time window in accordance with an embodiment of the present disclosure.

FIG. 11 illustrates a schematic flow diagram of a method 1100 of determining a sampled average value $V_{out\_filter}$ of a sampled voltage within a time window in accordance with an embodiment of the present disclosure. The method 1100 may be implemented at block 1002.

At block 1101, the control apparatus 400 subtracts the at least one sampled voltage within the previous time window from the first summed value of sampled voltage data within the previous time window preceding the target time window to generate the intermediate value, the sampled point corresponding to the at least one sampled voltage being located within the previous time window and outside the target time window. In some embodiments, the sampled voltage data within the previous time window and within the target time window is stored in the first-in-first-out manner.

At block 1102, the control apparatus 400 adds the intermediate value to at least one sampled voltage obtained after the previous time window to generate the second summed value of sampled voltage data within the target time window.

At block 1103, the control apparatus 400 determines the sampled average value $V_{out}$_filter based on the second summed value and the number of samples within the target time window. In some embodiments, the number of samples within the target time window is 2 to the M power, where M is a positive integer. In some embodiments, the control apparatus 400 right shifts the second summed value based on the number of samples N to generate the sampled average value.

Those skilled in the art will appreciate that the various steps of the methods of the present disclosure described above may be implemented by general purpose computing devices, may be centralized on a single computing device, or may be distributed over a network of multiple computing devices, may alternatively be implemented in program code executable by the computing devices, such that they may be stored in a storage device for execution by the computing devices, may be implemented as separate integrated circuit modules, or multiple modules or steps thereof may be implemented as a single integrated circuit module. As such, the present disclosure is not limited to any particular combination of hardware and software.

It should be understood that while several means or sub-means of a device have been mentioned in the detailed description above, such division is merely exemplary and not mandatory. Indeed, the features and functions of two or more apparatuses described above may be embodied in one apparatus according to embodiments of the present disclosure. Conversely, the features and functions of one apparatus described above may be further divided into embodiments that are embodied by multiple apparatuses.

The above description is merely an alternative embodiment of the present disclosure and is not intended to limit the present disclosure, as various modifications and variations of the present disclosure will occur to those skilled in the art. Any modifications, equivalents, improvements, etc. that come within the spirit and scope of the disclosure are intended to be embraced therein.

I claim:

1. A method for controlling a power factor correction (PFC) circuit, the method comprising:

obtaining a sampled voltage data set, the sampled voltage data set representing a sampled voltage for sampling an output voltage of the PFC circuit at a predetermined sampling frequency within a target time window of a predetermined duration;

determining a sampled average value of a sampled voltage within a time window based on the sampled voltage data set;

determining a difference between the sampled average value and a reference output voltage; and generating a control signal to control ON and OFF of a switching device of the PFC circuit, wherein generating the control signal comprises:

obtaining an input current of the PFC circuit and a signal indicative of a phase of an input voltage of the PFC circuit;

determining an effective value of the input voltage; and generating the control signal by comparing the input current with a signal obtained by dividing, by the effective value, a product of the difference and the signal indicative of the phase of the input voltage of the PFC circuit.

2. The method of claim 1, wherein determining the sampled average value further comprises:

subtracting at least one sampled voltage within a previous time window from a first summed value of sampled voltage data within a previous time window preceding the target time window to generate an intermediate value, a sampled point corresponding to the at least one sampled voltage being located within the previous time window and outside the target time window;

adding the intermediate value to at least one sampled voltage obtained after the previous time window to generate a second summed value of sampled voltage data within the target time window; and determining the sampled average value based on the second summed value and a number of samples within the target time window.

3. The method of claim 2, wherein sampled voltage data within the previous time window and within the target time window are stored in a first-in-first-out manner.

4. The method of claim 2, wherein the number of samples within the target time window is 2 to a power of M, where M is a positive integer.

5. The method of claim 4, wherein determining the sampled average value further comprises:

right shifting the second summed value based on the number of samples to generate the sampled average value.

6. The method of claim 1, wherein the predetermined duration is a period duration of a voltage across an alternating current (AC) side of the PFC circuit.

7. A control apparatus for a power factor correction (PFC) circuit, the control apparatus comprising:

at least one processor configured to:

obtain a sampled voltage data set, the sampled voltage data set representing a sampled voltage for sampling an output voltage of the PFC circuit at a predetermined sampling frequency within a target time window of a predetermined duration;

determine a sampled average value of a sampled voltage within a time window based on the sampled voltage data set;

determine a difference between the sampled average value and a reference output voltage; and generate a control signal to control ON and OFF of a switching device of the PFC circuit, wherein the at least one processor, to generate the control signal, is configured to:

obtain a signal indicative of a phase of an input voltage of the PFC circuit and an input current of the PFC circuit;

determine an effective value of the input voltage; and generate the control signal by comparing the input current with a signal obtained by dividing, by the effective value, a product of the difference and the signal indicative of the phase of the input voltage of the PFC circuit.

8. The control apparatus of claim 7, wherein the at least one processor, to determine the sampled average value, is further configured to:

subtract at least one sampled voltage within a previous time window from a first summed value of sampled voltage data within a previous time window preceding the target time window to generate an intermediate value, a sampled point corresponding to the at least one sampled voltage being located within the previous time window and outside the target time window;

add the intermediate value to at least one sampled voltage obtained after the previous time window to generate a second summed value of sampled voltage data within the target time window; and determine the sampled average value based on the second summed value and a number of samples within the target time window.

9. The control apparatus of claim 8, wherein sampled voltage data within the previous time window and within the target time window are stored in a first-in-first-out manner.

10. The control apparatus of claim 8, wherein the number of samples within the target time window is 2 to a power of M, where M is a positive integer.

11. The control apparatus of claim 10, wherein the at least one processor, to determine the sampled average value, is further configured to:

right shift the second summed value based on the number of samples to generate the sampled average value.

12. The control apparatus of claim 7, wherein the predetermined duration is a period duration of a voltage across an alternating current (AC) side of the PFC circuit.

13. A non-transitory computer-readable medium embodying programmed instructions which, when executed by at least one processor, cause the at least one processor to:

obtain a sampled voltage data set, the sampled voltage data set representing a sampled voltage for sampling an output voltage of a power factor correction (PFC) circuit at a predetermined sampling frequency within a target time window of a predetermined duration;

determine a sampled average value of a sampled voltage within a time window based on the sampled voltage data set;

determine a difference between the sampled average value and a reference output voltage; and generate a control signal to control ON and OFF of a switching device of the PFC circuit, wherein the programmed instructions, to generate the control signal, cause the at least one processor to:

obtain a signal indicative of a phase of an input voltage of the PFC circuit and an input current of the PFC circuit;

determine an effective value of the input voltage; and generate the control signal by comparing the input current with a signal obtained by dividing, by the effective value, a product of the difference and the signal indicative of the phase of the input voltage of the PFC circuit.

14. The non-transitory computer-readable medium of claim 13, wherein the programmed instructions, to determine the sampled average value, further cause the at least one processor to:

subtract at least one sampled voltage within a previous time window from a first summed value of sampled voltage data within a previous time window preceding the target time window to generate an intermediate value, a sampled point corresponding to the at least one sampled voltage being located within the previous time window and outside the target time window;

add the intermediate value to at least one sampled voltage obtained after the previous time window to generate a second summed value of sampled voltage data within the target time window; and determine the sampled average value based on the second summed value and a number of samples within the target time window.

15. The non-transitory computer-readable medium of claim 14, wherein the number of samples within the target time window is 2 to a power of M, where M is a positive integer.

16. The non-transitory computer-readable medium of claim 15, wherein the programmed instructions, to determine the sampled average value, further cause the at least one processor to:

right shift the second summed value based on the number of samples to generate the sampled average value.

17. The non-transitory computer-readable medium of claim 13, wherein the predetermined duration is a period duration of a voltage across an alternating current (AC) side of the PFC circuit.

* * * * *